United States Patent Office 3,085,784
Patented Apr. 16, 1963

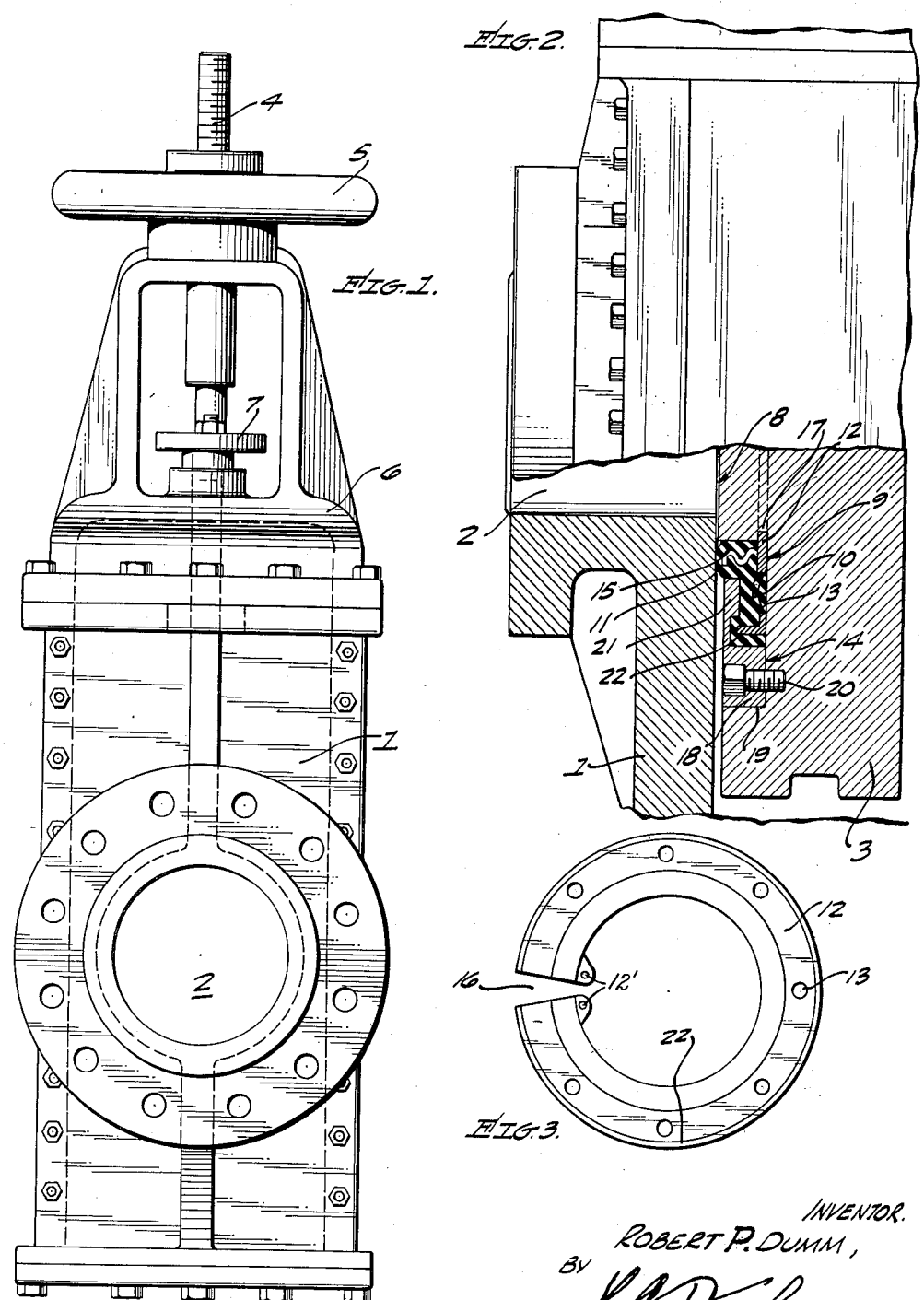

3,085,784
SOFT SEAT WITH METAL INSERT FOR
GATE VALVES
Robert P. Dumm, Long Beach, Calif., assignor to Pacific Valves, Inc., Long Beach, Calif., a corporation of California
Filed Sept. 29, 1960, Ser. No. 59,338
3 Claims. (Cl. 251—176)

This invention relates to a soft seat with metal insert for gate valves in which either gate, globe, check, or other valves of a similar type are effectively sealed under high pressure. The invention provides a primary metal to metal seal between the gate and the body of the valve, and also an elastomer special or secondary seal which is yieldably pressed against the body of the valve to provide a secondary or auxiliary seal to prevent high pressure leakage between the gate and the body of the valve.

An object of my invention is to provide a novel means of obtaining both rigidity and a spring-like action to the elastomer seal.

Another object is to provide a novel elastomer seal including a collapsible metal insert, which insert snaps into a groove in the wedge or gate to retain the seal in position at high pressure.

Still another object is to provide a novel means of mounting the elastomer seal in the wedge or gate of a valve so that the seal will not blow out under high pressure, and also to hold the seal in proper position and prevent high pressure flow of the material of which the seal is formed.

Other objects, advantages and features of inventon may appear from the accompanying drawing, the subjoined detailed description and the appended claims.

In the drawing:

FIGURE 1 is a side elevation of a gate valve to which my soft seat may be applied.

FIGURE 2 is a fragmentary vertical sectional view through the intake port of the valve.

FIGURE 3 is a front elevation of the metal insert in the soft seal.

Referring more particularly to the drawing, the numeral 1 indicates the body of a gate or slide valve which includes an intake port 2. The outlet port (not shown) is in alignment with the intake port, all of which is usual and well known in valves of this type. A gate, slide, or wedge 3 is mounted for vertical movement within the body 1 and this gate is attached to a threaded stem 4 which is engaged with the hand wheel 5 to cause the stem and the gate to move vertically to open or close the valve. Other structural features of the valve, such as the bonnet 6, the packing 7, are usual and well known in this art and these particular items form no part of the present invention. When the gate 3 is in closed position, as shown in FIG. 2, it is necessary to pack-off this gate, especially when the valve is in a high pressure line, and this pack-off is accomplished in the following manner: The gate or wedge 3 is formed with a metal seating surface 8 which engages the body 1 of the valve around the port 2, substantially as shown in FIG. 2. The primary metal to metal seat 8 might permit a certain amount of leakage past the valve, and to prevent such leakage a secondary seal 9 is provided in the gate 3 adjacent the metal seat 8 and surrounding the same. The secondary seal 9 consists of an elastomer ring or complete annulus 10 formed of rubber, plastic, or similar elastomer substance. The ring 10 includes an outwardly projecting ring seal 11 which engages the body 1 of the valve in the closed position of the parts, as shown in FIG. 2. The seal 11 being formed of an elastic substance will engage and effectively seal the area between the body 1 and the gate or wedge 3. To effectively mount the sealing ring 10 and to prevent its dislodgment under high pressure, and also to prevent high pressure flow of the material of the seal, the following structure is utilized: A metal insert 12 is mounted on the back face of the elastomer ring 10 and is formed with a plurality of holes 13 through which the elastic material flows, thus interlocking the insert and the elastomer ring so that the two parts will not readily separate. The elastic material flowing out through the holes 13 will also form a back seal which presses against the wall of the recess 14 of the wedge 3 and in which the elastomer seal is seated. A plurality of springs 15 are tack-welded at one end to the insert 12 and are embedded within the seal 11, thus providing a spring action which presses the seal 11 outwardly into engagement with the body 1 of the valve. The insert 12 is split, as shown at 16, so that this insert can be spread by means of a plier-like tool and snapped into an annular groove 17 formed in the wedge 3. The insert 12 thus serves to lock the ring 10 securely within the wedge 3. When the ring 10 is molded the insert 12 is included in the mold and the elastomer substance of the ring 10 will flow through the holes 13 to lock the insert 12 within the ring 10. The ears 12' provide a convenient means of attaching a spreading tool when the ring 10 is placed in the gate 3.

To further hold the ring 10 in position in the wedge 3, I provide a compression plate 18 which fits in the recess 19 in the wedge 3, and is held in position by a plurality of bolts 20. An inwardly projecting lip 21 on the compression plate 18 fits into the elastomer ring 10 substantially as shown, and is preferably positioned immediately below the seal 11 to act as a support for the lower surface of the seal. An outwardly projecting flange 22 on the metal insert 12 is spaced somewhat from the lip 21, thus acting as a further stiffener and reinforcing means for the elastomer ring 10. The lip 21, flange 22, and springs 15 will serve to reinforce, stiffen, and hold the ring 10 in proper position, and also prevent dislodgment or material flow under high pressures.

Having described my invention, I claim:

1. In a slide valve having a gate slidably mounted therein, a soft seat positioned in the gate to seal the same, said soft seat including an elastomer ring, a metal insert, means fixedly mounting the metal insert in said elastomer ring, and a compression plate mounted in the gate and engaging the elastomer ring to hold said ring in position, and detachable means securing the compression plate to said gate, and a plurality of springs extending from the metal insert and embedded within the elastomer ring at right-angles to the sealing face of said elastomer ring.

2. In a slide valve having a gate slidably mounted therein, a soft seat positioned in the gate to seal the same, said soft seat including an elastomer ring, a metal insert, means fixedly mounting the metal insert in said elastomer ring, and a compression plate mounted in the gate and engaging the elastomer ring to hold said ring in position, and detachable means securing the compression plate to said gate, and a plurality of springs extending from the metal insert and embedded within the elastomer ring at right-angles to the sealing face of said elastomer ring, the inner periphery of said metal insert projecting beyond the periphery of the elastomer ring, said gate having a groove therein to receive the projecting portion of the metal insert.

3. In a slide valve having a gate slidably mounted therein, a soft seat positioned in the gate to seal the same, said soft seat including an elastomer ring, a metal insert, means fixedly mounting the metal insert in said elastomer ring, and a compression plate mounted in the gate and engaging the elastomer ring to hold said ring in position, and detachable means securing the compression plate to said gate, and a plurality of springs extending from the metal insert and embedded within the elastomer ring at right-angles to the sealing face of said annular seal member, the inner periphery of said metal insert projecting beyond the periphery of the elastomer ring, said gate having a groove therein to receive the projecting portion of the metal insert, a flange on the metal insert, said flange projecting into the elastomer ring and arranged at a right-angle to the plane of the metal insert.

References Cited in the file of this patent

UNITED STATES PATENTS

| | | |
|---|---|---|
| 498,496 | Wilkes | May 30, 1893 |
| 540,547 | Hewitt | June 4, 1895 |
| 2,870,987 | Greenwood | Jan. 27, 1959 |
| 2,894,718 | Englert | July 14, 1959 |
| 2,985,422 | Anderson et al. | May 23, 1961 |